May 19, 1970     R. G. BOARD ET AL     3,512,730
RETRACTABLE SAFETY BELTS

Original Filed Dec. 14, 1964     5 Sheets-Sheet 1

INVENTORS
RICHARD G. BOARD
NELSON H. SHAPIRO

BY *Shapiro and Shapiro*

ATTORNEYS

May 19, 1970 R. G. BOARD ET AL 3,512,730
RETRACTABLE SAFETY BELTS
Original Filed Dec. 14, 1964 5 Sheets-Sheet 4

INVENTORS
RICHARD G. BOARD
NELSON H. SHAPIRO

BY *Shapiro and Shapiro*

ATTORNEYS of a typical embodiment of retractable seat belt apparatus

United States Patent Office 3,512,730
Patented May 19, 1970

3,512,730
RETRACTABLE SAFETY BELTS
Richard G. Board, Bethesda, Md. (3000 Connecticut Ave., Wash, D.C. 20008), and Nelson H. Shapiro, Hyattsville, Md. (7001 Old Cabin Lane, Rockville, Md. 20852)
Continuation of application Ser. No. 417,924, Dec. 14, 1964. This application July 3, 1967, Ser. No. 651,045
Int. Cl. B65h 75/48
U.S. Cl. 242—107.4     21 Claims

ABSTRACT OF THE DISCLOSURE

A seat belt retractor comprising a reel and a strap connected thereto for retraction and extension, and means for preventing extensile rotation of said reel, and further means for determining when said strap has been retracted to a predetermined retracted condition and for rendering said extensile-rotation preventing means inoperative only after said strap has been retracted to said condition, and strap guide means render the extensile-preventing means operative after the strap has been extended to a desired length and the force for extending the strap has been reduced.

---

This is continuation of application Ser. No. 417,924, filed Dec. 14, 1964.

This invention relates to retractable safety belts and more particularly to so-called retractable seat belts for use in automotive vehicles.

Copending applications Ser. No. 377,344, filed June 23, 1964, now Pat. No. 3,289,970, granted Dec. 6, 1966, and Ser. No. 409,266, filed Nov. 5, 1964, both entitled "Retractable Safety Belts," disclose and claim retractable seat belt apparatus in which a strap having a fastener member at a free end thereof may be grasped by the user and extended from a retraction device to place the strap in user-restraining position, whereupon further extension of the strap is prevented automatically in response, for example, to the cessation of extensile movement or to slight retractile movement of the strap. At the user-restraining position the strap may have any selected length within a wide range of lengths, so as to accommodate varying conditions of user size and clothing. The fastener member is engaged with a mating fastener member in order to complete the belt. When the fastener members are disengaged, the strap retracts automatically. The present application discloses and claims improvements and modifications in such apparatus and discloses and claims related apparatus.

It is accordingly a principal object of the invention to provide improved retractable seat belt apparatus and the like.

Another object of the invention is to provide improved retractable seat belt apparatus in which a strap may be readily extended to any selected length within a wide range of lengths, locked automatically against further extension, and retracted automatically when released.

Still another object of the invention is to provide improved apparatus for retractable seat belts and the like which is responsive to changes in tension of the strap.

A further object of the invention is to provide retractable seat belt apparatus which is normally locked against extension when in user-restraining position but which incorporates means for permitting extension without unfastening the belt, while preventing retractions, so that the user may have ready access to his pockets.

The aforesaid Ser. No. 409,266 discloses and claims retractable seat belt apparatus and the like having a member, such as a pin, past which the strap is trained, the member being moved automatically to a first position when the strap is retracted, remaining in that position during extension of the strap, and moving automatically to a second position when extensile movement of the strap ceases. At the second position the member serves to prevent further extensile movement of the strap. It is a princpal object of the present invention to provide improved retractable seat belt apparatus and the like employing this principle.

Still another object of the invention is to provide retractable seat belt apparatus of the foregoing type which utilizes variations in the forces in the strap extending from the aforesaid member to provide the desired locking action.

Yet another object of the invention is to provide an improved retractable seat belt and the like employing a feeler mechanism for sensing the amount of strap wound upon a retraction reel and for controlling the operation of the aforesaid member.

Still another object of the invention is to provide retractable seat belt apparatus and the like having improved means for preventing extensile movement of the belt has been placed in user-restraining position.

A further object of the invention is to provide retractable seat belt apparatus and the like having improved means for preventing extensile movement of a retracting reel.

A still further object of the invention is to provide retractable seat belt apparatus and the like having improved means for utilizing the lateral thrust of the belt upon a guide member which is proportional to the tension of the belt.

Still another object of the invention is to provide improved retractable seat belt apparatus and the like which utilizes belt friction beneficially.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments, and wherein.

To summarize briefly, and without intent to limit the scope of the invention, a preferred embodiment of the invention utilizes a retraction reel having ratchet wheels affixed to its ends and having a plate member pivoted adjacent to the reel for movement about an axis substantially parallel to the rotational axis of the reel and provided with pawls adapted to engage the ratchet wheels to prevent extensile movement of the reel but yet to permit retractile movement. A strap wound upon the reel passes from the reel over an edge of the plate member, so as to be deflected or indented somewhat thereby, and has a free end provided with a fastener member adapted to engage a mating fastener member to place the belt in user-restraining position. The plate member senses the amount of strap wound upon the reel and moves to a first position, at which the pawls are disengaged from the ratchet wheels, when the strap is substantially fully retracted. During the extension of the strap the plate member remains in its first position because of the pressure resulting from the tension in the strap. However, when the extensile movement ceases and the fastener-end of the strap is relaxed somewhat, the plate member moves to a second position, at which the pawls engage the teeth of the ratchet wheels, due to the retractile force of the reel. Further extensile pull upon the strap is ineffective to increase the length of the strap withdrawn from the reel and, in fact, locks the reel more tightly. When the belt is unfastened, the strap retracts automatically and is wound upon the reel.

Figure 1:
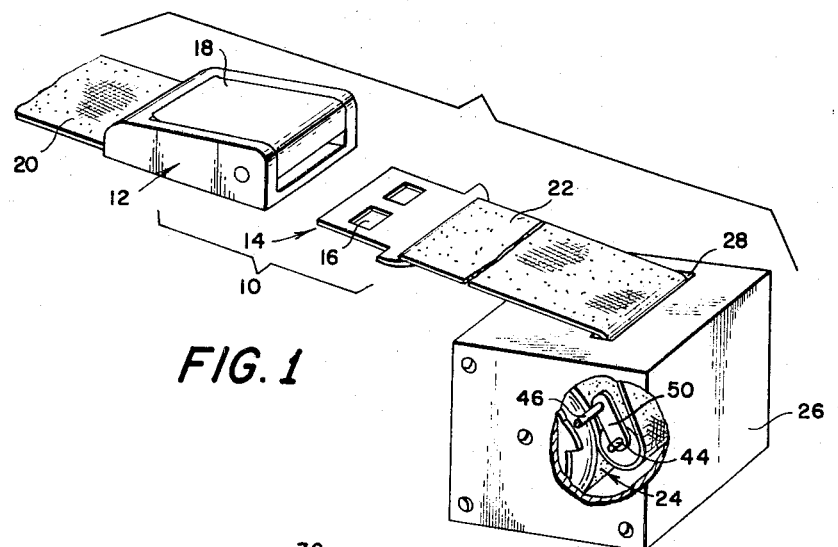
FIG. 1 is a perspective view illustrating the external appearance of housing, strap, and fastener components of a typical embodiment of retractable seat belt apparatus in accordance with the invention, the housing being partially broken away.

Referring to the drawings, and initially to FIG. 1 thereof, reference numeral 10 designates a conventional seat belt fastener couple comprising a buckle 12 and a tongue 14. The fastener parts may have the usual construction, the buckle comprising a housing having an access opening at the front for reception of the tongue and including the usual locking abutments which enter the openings 16 of the tongue so as to retain the tongue in the buckle until the buckle release lever 18 is actuated. A strap 20 affixed to the buckle may have its distal end anchored to the floor of the vehicle at one side of the seat, for example. This strap may be kept quite short, may be rigidified, and need not be adjustable. Strap 22, such as nylon webbing, is affixed to the tongue and is arranged to be retracted and extended with respect to a retraction device 24, which may be a spring-wound retraction reel supported for rotation in a housing or casing 26 anchored to the floor of the vehicle at the opposite side of the seat, for example. The housing may be appropriately contoured to minimize space requirements and for aesthetic reasons and may have an opening 28 through which the strap 22 moves and at which the tongue 14 is located when the strap is fully retracted.

Figure 2:
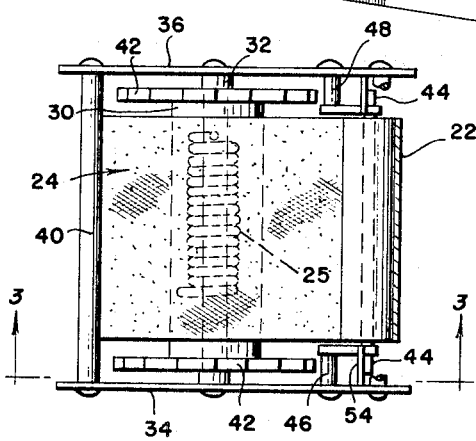
FIG. 2 is a horizontal sectional view illustrating apparatus contained within the housing shown in FIG. 1.

As is well known in the art, the reel 24 (FIG. 2) may comprise a tubular hub 30 having bearings (not shown) at each end for supporting the hub for rotation upon a pin 32 extending axially through the hub and fixed between side plates 34 and 36 of a frame, which may be part of the housing 26. A helical torsion spring 25 is received loosely within the hub between the hub and the pin 32 and has one end fixed to the pin and the other end fixed to the hub, so that the spring is wound when the reel is turned in a direction to extend the strap. Other types of reels, such as those using spiral clock springs at the ends, may also be used. The side plates 34 and 36 may be joined by spacers 40, and the opening 28 at the top of the housing may be provided with guide surfaces, as shown in FIG. 3, to direct the strap 22.

In accordance with the invention the retraction reel is provided with a ratchet wheel 42 fixed to each end of the hub, although a single ratchet wheel affixed to one end of the hub might also be employed. The teeth of the ratchet wheels are shaped to prevent clockwise (extensile) rotation of the reel as viewed in FIG. 3, when engaged with pawls 44 projecting from the sides of a U-shaped yoke supported for pivotal movement at 46 and 48 upon the frame or housing. The sides 50 of the yoke, spaced to embrace the webbing, may be formed integrally with pivot pins which turn in openings upon the side plates 34 and 36 of the frame or may have openings for receiving stub shafts fixed to the side plates of the frame. Preferably the yoke is formed as a single piece including the bight portion 52, which may be in the form of a cylindrical cross-pin. Movement of the yoke away from the reel is limited by a stop, such as pins 54 projecting from the side plates of the frame and arranged to engage the sides 50 of the yoke. The end of strap 22 opposite the tongue 14 is fixed to the hub of the reel in any suitable manner. The strap is wound upon the reel, as shown in FIG. 3, and passes under pin 52, reversely about the pin, and upwardly to the opening 28 in the housing.

As more fully set forth in the aforesaid co-pending Ser. No. 409,266, the applicants have discovered that the yoke may be moved in a first direction to a position against a stop at which the relationship of the forces in the portions of the strap at opposite sides of the pin 52 maintains the yoke in that position as long as the strap 22 is pulled to extend it. However, after extensile pull ceases and the fastener-end of the strap is relaxed somewhat, the yoke moves in the opposite direction. This phenomenon is believed to result from the fact that the tension in the portion of the strap between the reel and the pin 52 is limited by the retractile force of the reel, while the tension in the portion of the strap between the pin and the tongue 14 is greater during extension by virtue of the need for overcoming the friction about the pin. Thus, during extension of the strap the force on the tongue side of pin 52 predominates to create a turning moment which keeps the yoke against the stop, but upon relaxation of the tongue end of the strap, the force on the reel side of pin 52 predominates to create a turning moment in the opposite direction. The friction at pin 52 may be increased by suitable roughening of the surface of the pin, although sufficient friction is offered by a smooth surface, which minimizes the extensile pull required.

Figure 3:
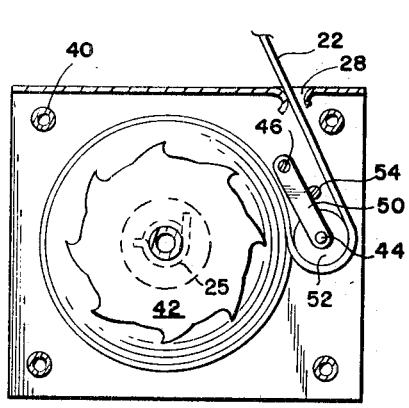
FIG. 3 is a vertical sectional view taken along line 3—3 of FIG. 2.
Figure 4:
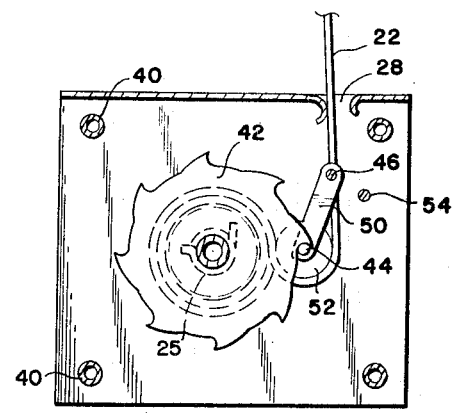
FIG. 4 is a similar vertical sectional view illustrating a different condition of the apparatus.
Figure 5:
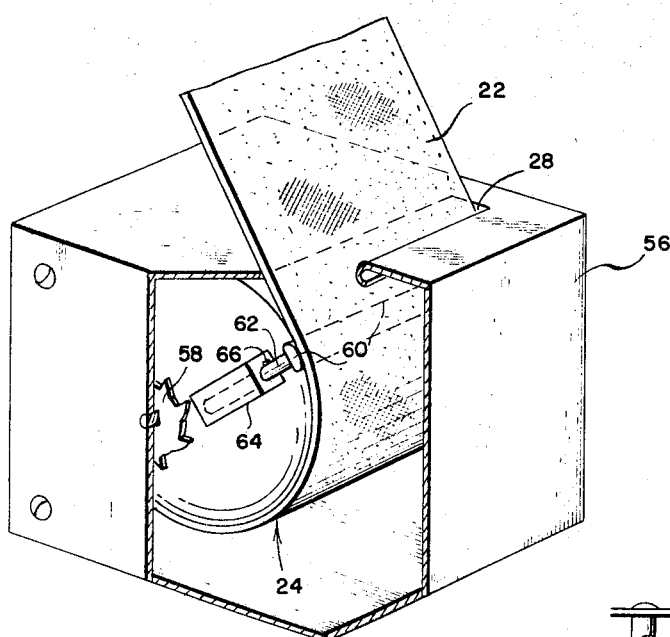
FIG. 5 is a perspective view, partially broken away, illustrating a modification of the invention.
Figure 6:
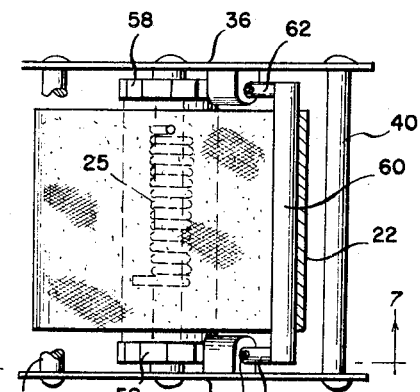
FIG. 6 is a horizontal sectional view of apparatus contained within the housing shown in FIG. 5.
Figure 7:
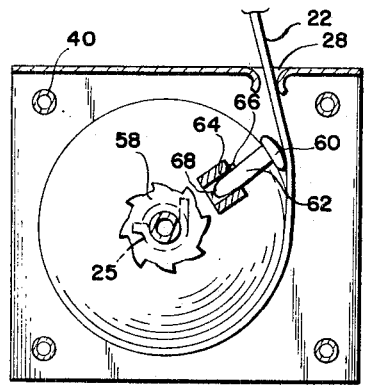
FIG. 7 is a vertical sectional view taken along line 7—7 of FIG. 6.
Figure 8:
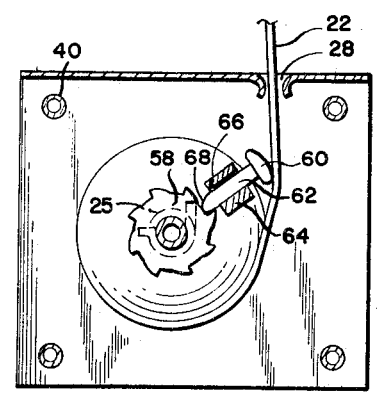
FIG. 8 is a similar vertical sectional view illustrating another condition of the apparatus.
Figure 10:
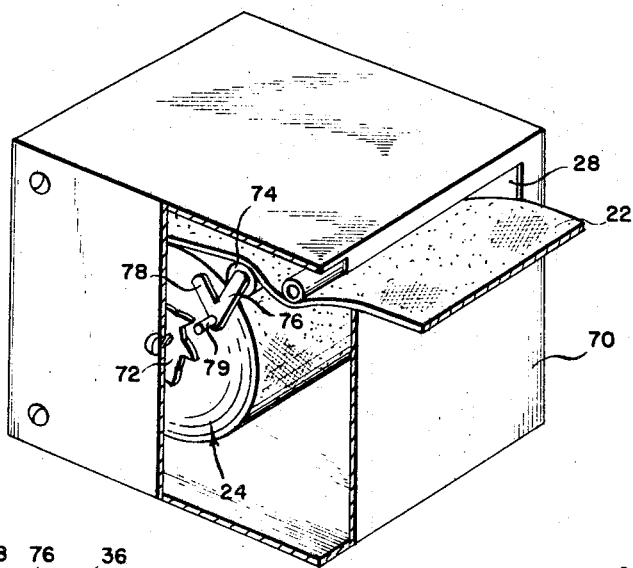
FIG. 10 is a perspective view, partially broken away, illustrating another embodiment.

The yoke is moved to the position of FIG. 3 by the outward pressure on the pin 52 of the webbing wound upon the reel during retraction. When sufficient webbing has been extended from the reel, the yoke is capable of moving to the position of FIG. 4, at which the pawls 44 engage the teeth of the ratchet wheels.

Assuming that the yoke is in the position of FIG. 3, as the strap is extended, the effective reel diameter decreases, and the yoke is no longer supported by the webbing wound upon the reel but rather is held in the position of FIG. 3 by the extensile pull. When the strap has been extended to the user-restraining position, the strap tension between the tongue 14 and the pin 52 is reduced upon cessation of extensile movement of the strap or upon slight retractile movement of the strap, and the tension of the strap between the reel and the pin due to the retractile force of the reel is sufficient to move the yoke to the position of FIG. 4, at which the ratchet is engaged and extension of the strap is prevented. The movement of the yoke should be sufficient so that any further extensile pull upon the strap will tend to turn the yoke more tightly against the ratchet wheels, rather than in the opposite sense. This is ensured if the yoke turns enough so that the resultant of the strap forces acting upon the pin is to the left of the pivotal axis 46 in FIG. 4.

If the belt is unfastened, the reel turns in a retractile direction, and the ratchet teeth pass under the pawls in the usual manner, the yoke turning slightly away from the reel to permit this movement. However, until sufficient webbing has been wound upon the reel to force the pawls out of engagement with the ratchet teeth, the reel will relock in response to an extensile pull upon the strap.

The position of the yoke in FIG. 3, at which the yoke will remain during extension of the strap, depends upon the amount of friction offered by the pin 52, the retractile force of the reel, the location of pivots 46 and 48 with respect to the reel, and the location of opening 28 with respect to the pivots. As the reel diameter decreases, during strap extension, the angle of the strap between the reel and the pin 52 changes to facilitate movement of the yoke to the position of FIG. 4, although a strap guide could be used to keep this angle constant during strap extension.

The yoke may have an additional (small diameter) cross-pin nearer the pivots, and this pin may be bowed to the left (in FIG. 3) to engage the webbing on the reel and serve as the "feeler" which moves the yoke to the position of FIG. 3. Pin 52 may then be shifted to the right (in FIG. 3) relative to sides 50 to accommodate more webbing on the reel in the position of FIG. 4.

FIGS. 5–8 illustrate another embodiment of the apparatus which may be contained within the housing, in this case designated by reference numeral 56. In the form shown the retraction reel 24 is wound oppositely from the embodiment of FIGS. 1–4, and ratchet wheels 58 fixed to the ends of the hub have their teeth reversed from the former embodiment. The embodiment of FIGS. 5–8 employs a reciprocating yoke having a cross-piece or bight 60 connected to and preferably integral with side legs 62, which reciprocate in guide sleeves 64 supported upon the side walls of the frame or housing. Legs 62 slide within the guide sleeves with some lateral play and are provided with small lateral protuberances or detents 66 adapted to overlap an end of the guide sleeves and prevent movement of the legs 62 into the sleeves.

The yoke embraces the webbing wound upon the reel, but the last turn of webbing passes over the cross-piece as shown. During retraction of the strap the webbing builds up upon the reel and forces the yoke outwardly approximately to the position of FIG. 7, at which the cross-piece 60 indents the webbing extending to the opening 28. If now the strap is extended, the friction of the strap engaging the cross-piece at either or both sides thereof tends to move the cross-piece upwardly in FIG. 7 and to lift the detents 66 over the edges of the sleeves 64 as shown. As long as the strap is being extended, the friction of the strap against the outside of the cross-piece and the pressure exerted upon the cross-piece by virtue of the strap tension will maintain the yoke in the position of FIG. 7, even after the effective reel diameter has decreased sufficiently to remove the support from inside of the yoke. When the strap has been extended to user-restraining position, the strap may be permitted to retract very slightly, and the frictional drag across the outside of the cross-piece will, by virtue of the free play of the yoke in its sleeves, release the detents 66 from the edges of the sleeves. The pressure of the strap upon the yoke will cause the yoke to move to and remain at the position of FIG. 8, at which the free ends of legs 62 serve as pawls engaging the ratchet teeth, and further extensile movement of the strap is prevented.

When the belt is unfastened, the reel turns in a retracting direction, and the ratchet teeth pass under the pawls, which may be contoured as indicated at 68 to facilitate this action. During retraction the yoke will oscillate slightly until the webbing has built up on the reel sufficiently to lift the yoke out of engagement with the ratchet wheels.

Figure 9:
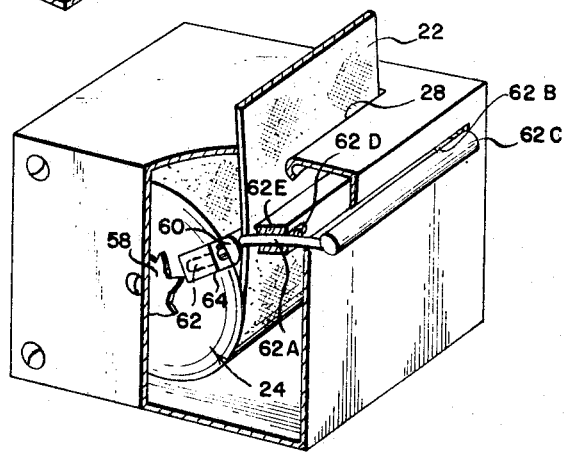
FIG. 9 is a perspective view, partially broken away, illustrating a modification.
Figure 11:
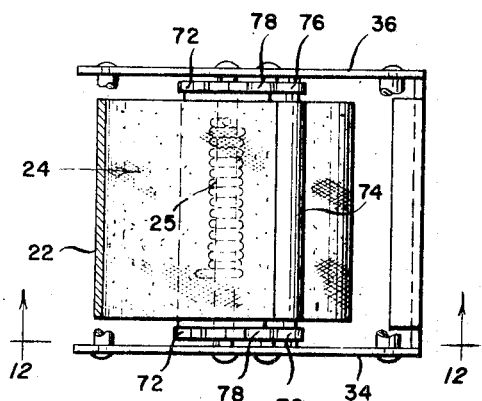
FIG. 11 is a horizontal sectional view of apparatus in the housing of FIG. 10.

FIG. 9 illustrates a modification which permits the user to extend the fastened belt to create slack, as when approaching a toll booth on a highway, and which permits the slack to remain temporarily. In this modification the arms 62 are elongated, as shown at 62A, so as to pass through opening 62B in a wall of the housing, where they are pointed by a handle 62C. Protuberances 62D may be provided upon the upper side of the arm extensions, so that if the handle is pulled to expose the arm extensions sufficiently, the protuberances will latch over the adjacent edge of the opening 62B outside of the housing and hold the arms in that position. The arm extensions may be somewhat springy to permit this latching action. A block 62E mounted upon the wall of the housing and embraced by the arm extensions serves as an abutment to place a drag upon the strap when the strap is engaged between this abutment and the outer surface of cross-pin 60. Thus, the handle 62C may be pulled manually to withdraw the pawls from the ratchet wheen and to place a drag upon the strap sufficient to prevent retractile movement of the strap but yet light enough to permit the user to withdraw strap from the reel in spite of the drag. The slack thereby created will remain until the handle 62C is depressed and pushed in to disengage the protuberances 62D and re-engage the pawls with the ratchet wheels.

Figure 12:
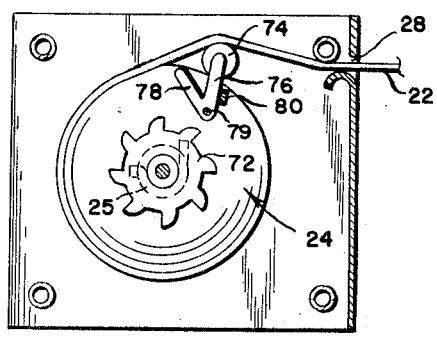
FIG. 12 is a vertical sectional view taken along line 12—12 of FIG. 11.

FIGS. 10–13 illustrate another embodiment of apparatus which may be placed in the housing, here designated by reference number 70. The reel 24 is wound in the direction of the embodiment of FIGS. 1–4 and the rathcet wheels 72 fixed to the opposite ends of the hub of the reel have their teeth oriented as in that embodiment. Instead of the strap 22 extending reversely under the pin of a yoke, as in FIG. 3, the strap extends over the cross-pin 74 of a yoke so as to be deflected thereby as shown in FIG. 12. The yoke in this embodiment has sides 76 fixed to pin 74 and is pivotally supported by pivots 79 upon the side plates of the frame or housing. Preferably the yoke is formed in a single piece including a pair of pawls 78 which extend substantially in the same plane as the sides 76. One or more stops 80 are provided upon the side walls of the frame or housing to limit the movement of the yoke in the position of FIG. 12.

Figure 13:
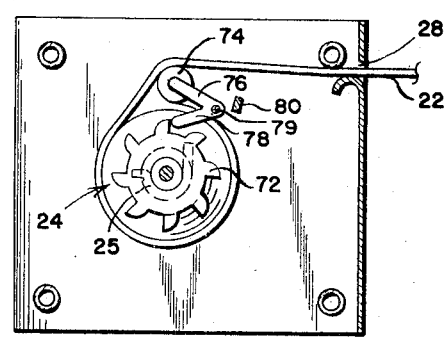
FIG. 13 is a similar vertical sectional view illustrating a different condition of the apparatus.
Figure 14:
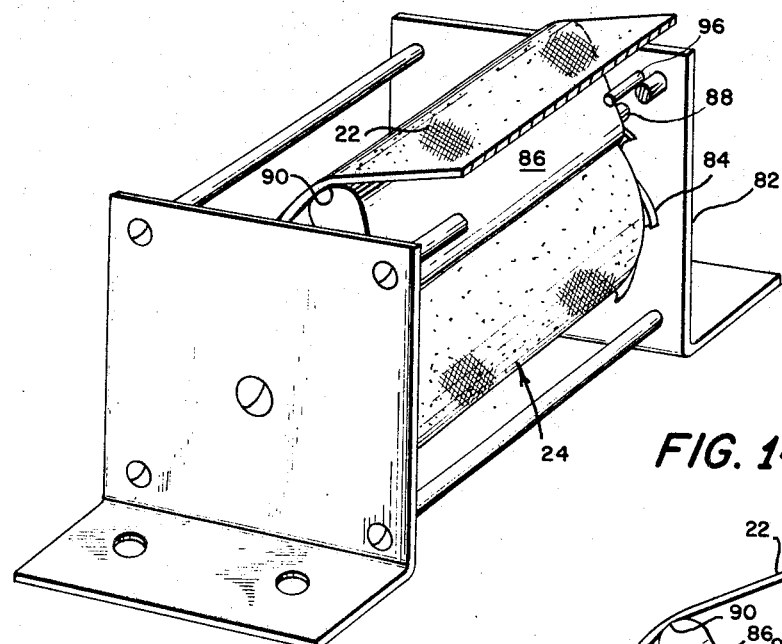
FIG. 14 is a perspective view illustrating another embodiment.
Figure 15:
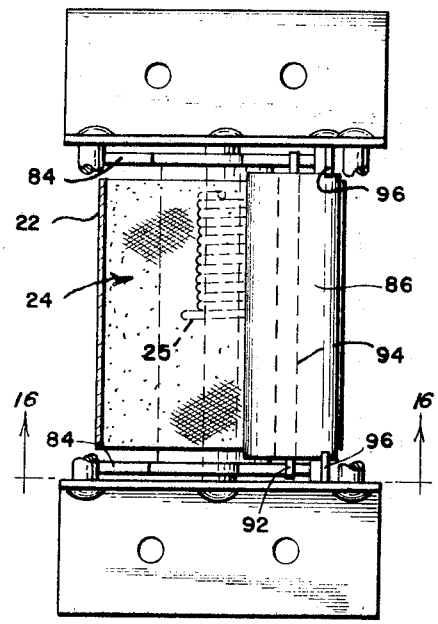
FIG. 15 is a top plan view of the apparatus of FIG. 14.

The build-up of webbing upon the reel during retraction presses upon the inner side of the cross-pin 74 and turns the yoke from the position of FIG. 13 to the position of FIG. 12. If now the strap 22 is extended, the friction of the strap passing over pin 74 maintains the yoke in the position of FIG. 12 after the webbing has been extended sufficiently to remove the support of the yoke from below. After the strap has been extended to user-restraining position, a slight retractile movement of the strap turns the yoke to the position of FIG. 13 due to the frictional drag upon the cross-pin 74 and the pressure of the webbing upon the pin resulting from the retractile force of the reel. In the position of FIG. 13 the pawls 78 are engaged with the ratchet teeth, and further extensile movement of the strap is prevented. Any extensile pull merely jams the pawls in more tightly. If the belt is now unfastened, retractile movement of the reel will cause the ratchet teeth to pass under the pawls, turning the yoke slightly outward, and the webbing will build-up upon the reel until the pawls are lifted out of engagement with the ratchet teeth. Finally the yoke will be turned to the position of FIG. 12.

FIGS. 14–17 illustrate an embodiment in which a generally rectangular plate is employed instead of a yoke. This embodiment is believed to be the best mode of carrying out the invention. A housing or frame 82 rotatably supports the reel 24 having ratchet wheels 84 fixed to its hub ends. A generally rectangular plate 86 is supported for pivotal movement upon the side plates of the housing or frame by means of a pin 88 extending through a bore adjacent to the lower edge of the plate. The upper edge of the plate is smoothly curved or rounded as shown at 90, and the plate has laterally extending pins 92 at the sides thereof adapted to engage the teeth of the ratchet wheels and to serve a spawls. The side of the plate adjacent to the reel is provided with a protuberance or ridge 94, which may extend partially or completely across the width of the plate adjacent to and parallel with the pivot pin 88. A stop 96, such as a protuberance extending from a side wall of the housing or frame, is adapted to engage the side of the plate remote from the reel so as to limit pivotal movement of the plate away from the reel. The strap 22 extends from the reel over the curved edge 90 of the plate to the belt fastener member (not shown) at a suitable angle so as to be deflected somewhat by the plate (see FIG. 16). Assuming that the bottom surface of the housing rests upon a horizontal plane, this angle may be within the range, for example, of approximately zero degrees to approximately forty-five degrees above horizontal. The housing may have an opening at its right side in FIG. 16, the edges of which restrict the pull-off angle to this range. The ridge 94 engages the strap wound upon the reel when the strap is almost fully retracted and turns the plate clockwise from the position of FIG. 17 to the position of FIG. 16, at which the elevation angle of the plate is about sixty degrees and the pawls are disengaged from the ratchet wheels.

Figure 16:
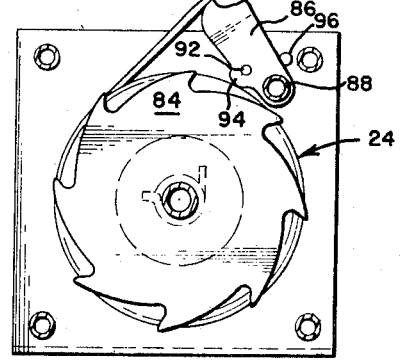
FIG. 16 is a vertical sectional view taken along line 16—16 of FIG. 15.
Figure 17:
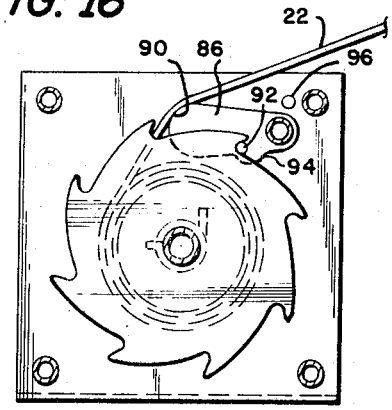
FIG. 17 is a similar vertical sectional view illustrating a different condition of the apparatus.
Figure 18:
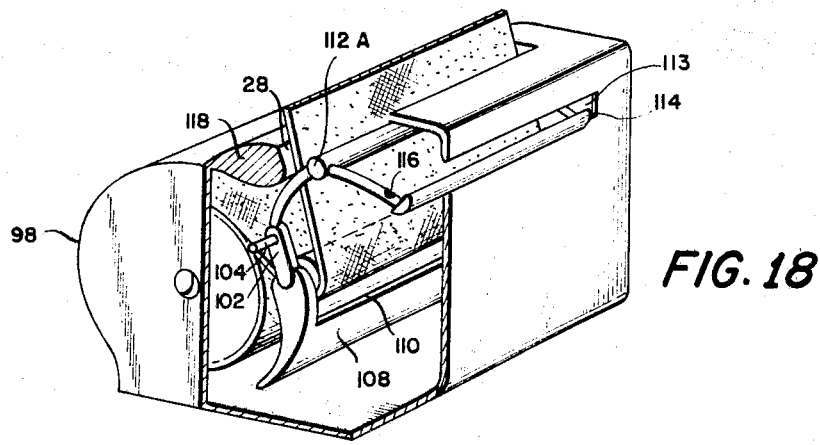
FIG. 18 is a perspective view, partially broken away, illustrating another embodiment.

While the strap is being extended from the housing, the plate will remain in the position of FIG. 16 due to the drag of the strap over the plate and the pressure exerted by the strap upon the plate as the result of the tension in the strap. Upon cessation of the extensile movement, or upon slight retractile movement (depending somewhat upon the position of the stop 96 and the angle at which the strap is pulled), plate 86 turns counterclockwise from the position of FIG. 16, and pawls 92 engage the teeth of the ratchet wheels so as to prevent further strap extension. Any further extensile pull upon the strap presses the plate more tightly toward the reel so as to maintain the pawls inserted in the teeth. The teeth may also be contoured to draw the pawls in. Since the ridge 94 is close to the pivot axis of the plate, it clears the wedding remaining upon the reel after relatively little webbing has been withdrawn from the reel.

When the belt is unfastened, strap 22 retracts in the manner described above. The ratchet teeth pass under the pawls, lifting the plate easily because the belt is not under appreciable tension. When the reel is full enough, the pawls are lifted by pressure of the wound webbing upon ridge 94 so as to disengage the pawls from the ratchet teeth. Finally the apparatus assumes the condition of FIG. 16, in which the strap is fully retracted.

In the typical embodiment of FIGS. 14–17 the side plates of the frame are 2¼" square. The reel axis is at the center of the side plates. The pivotal axis of the plate 86 is about 1" from the reel axis approximately on a diagonal of the side plates. The outer diameter of the ratchet wheels is about 1¾", which is approximately the diameter of the wound webbing in FIG. 16. The outer diameter of the reel hub is about ⅝", and the total length of the webbing is about 30". The distance between the outer surfaces of the side plates is about 2½", and the distance between the inner surfaces of the ratchet wheels is about 2⅛". The width of the plate 86 between the apex of cylindrical edge 90 and the opposite edge is about ⅞". The maximum thickness of the plate 86, just below edge 90, is about 5/16". Pin 88 is 3/16" O.D. and its bore is about 1/32" in from the adjacent edge of plate 86. The thickness of plate 86 at the axis of the bore is about ¼". The center-to-center distance between pawls 92 and the bore is about 9/32". The pawls are about 1/16" from the lower side of plate 86. Ridge 94 has a width of about 3/16", a projection of about 1/16" and is about ¼" from the edge of plate 86 adjacent the bore. Edge 90 has a radius of about 5/32".

FIGS. 18–21 illustrate another embodiment. In this embodiment the housing 98 contains the reel 24, but no ratchet wheels are used. A yoke 100 is employed similar to the yoke of the embodiment of FIGS. 1–4, the sides 102 being pivotally supported upon the side walls of the housing by means of stub shafts 104 and being fixed to the ends of a cross-pin 106. In this case, however, the yoke has an extension in the form of a brake shoe 108. The brake shoe may be a curved plate having a slot 110 through which the strap 22 passes.

Figure 19:
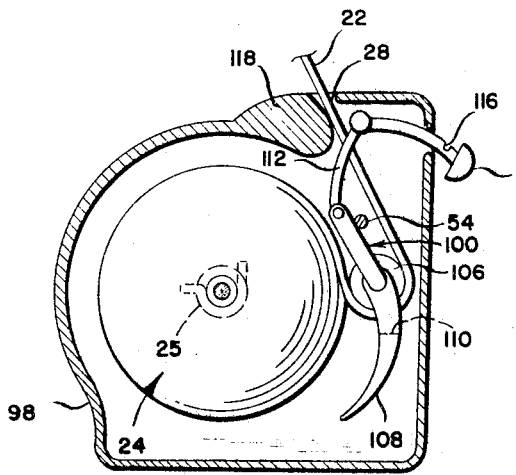
FIG. 19 is a vertical sectional view illustrating apparatus contained within the housing shown in FIG. 18.
Figure 20:
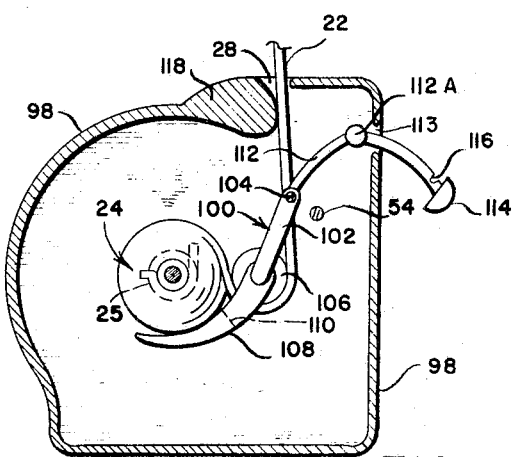
FIG. 20 is a similar vertical sectional view illustrating another condition of the apparatus.
Figure 21:
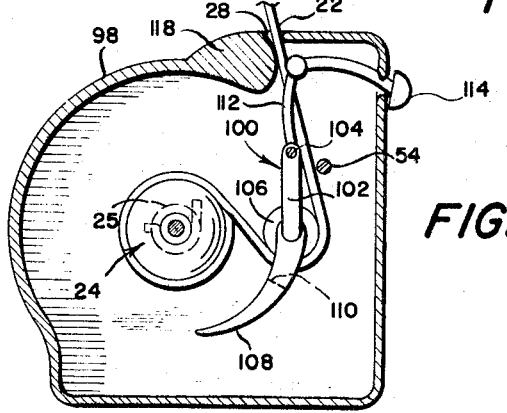
FIG. 21 is a similar vertical sectional view illustrating still another condition of the apparatus.

The yoke and the brake shoe are moved to the position of FIG. 19 by engagement with the webbing wound upon the reel when the webbing is fully retracted and remain in that position during extension of the strap as described previously. After extension of the strap, when the strap is relaxed somewhat, the yoke and the brake shoe move to the position illustrated in FIG. 20, at which the brake shoe engages the webbing remaining upon the reel and prevents further extensile movement of the reel. The brake shoe may be roughened to increase friction with the webbing on the reel. Due to the fact that the yoke is in effect moved over-center, any further extensile pull upon the strap tends to turn the brake shoe more tightly against the reel. The force upon the cross-pin is approximately twice the tension in the webbing between the cross-pin and the tongue, and the angle of pull relative to the plane of the yoke may be chosen to maximize the force exerted upon the brake shoe. The brake shoe may engage brake drums fixed to the ends of the reel, rather than engage the webbing, and another cross-pin may be provided upon the yoke to serve as the "feeler" as described in connection with FIGS. 1–4 and 14–17.

FIGS. 18–21 also illustrate mechanism by which the user may further extend the strap without unfastening the belt and may maintain slack thereby created. For this purpose the sides 102 are elongated to form arms 112. The arms pass through an opening 113 in the housing and are joined by a handle 114. The arms are provided with notches 116 arranged to latch over an edge of the opening when the handle is pressed in far enough. The arms are shaped so as to be normally free of the edges of the opening. An abutment 118 is attached to or formed upon the inside of the housing adjacent to opening 28, and a member 112A extends between arms 112 at the opposite side of strap 22.

When the handle 114 is pressed in, the yoke is moved so as to release the brake shoe from the reel. Further pressure upon the handle wedges the strap between member 112A and abutment 118 and inserts the notches 116 so as to hold the mechanism in this position. Arms 112 are slightly springy to permit this action. The strap may then be extended despite the drag thereon, but will not retract until handle 114 is depressed to release the notches 116.

While exemplary embodiments of the invention have been shown and described, it will be apparent to those skilled in the art that changes can be made in these embodiments without departing from the principles and spirit of the invention, the scope of which is defined in the appended claims. For example, within the broader aspects of the invention, other means, such as spring actuation or gravity actuation may be used instead of or in addition to sensing of the webbing on the reel for moving a yoke or plate to a first position, when the strap is retracted. Moreover, the term "first position" is not intended to restrict the invention to maintenance of precisely the same yoke or plate position during strap extension; the term "substantially" is used in conjunction with the term "first position" to indicate that the yoke or plate may move somewhat upon initial extension of the strap but nevertheless remains away from the "second position." Accordingly, the foregoing embodiments are to be considered illustrative rather than restrictive of the invention, and those modifications which come within the meaning and range of equivalency of the claims are to be included therein.

The invention claimed is:

1. A retractable belt or the like comprising a retraction reel, a strap connected to said reel for retraction and extension, means for preventing extensile rotation of said reel, means for determining when said strap has been retracted to a predetermined retracted condition and for rendering said extensile-rotation-preventing means inoperative only after said strap has been retracted to said condition, and strap guide means, about which said strap is trained, receiving a force from said strap during extension of said strap to a desired length and responsive to reduction of said force thereafter for rendering the extensile-rotation-preventing means operative.

2. The retractable belt of claim 1, further comprising manually actuated means for rendering said extensile-rotation-preventing means inoperative.

3. The retractable belt of claim 2, further comprising means responsive to the manually actuated means for preventing retraction of said strap.

4. The retractable belt of claim 3, said retraction-preventing means comprising means for applying a drag force to said strap.

5. A retractable seat belt or the like comprising a retraction reel, a strap connected to said reel for retraction and extension, means for preventing extensile rotation of said reel, means for determining when said strap has been retracted to a predetermined retracted condition and for rendering said extensile-rotation-preventing means inoperative only after said strap has been retracted to said condition, and strap guide means about which said strap is trained and responsive to retractile movement of said strap at said guide means for rendering the extensile-rotation-preventing means operative when said strap has been extended to a user-restraining position following retraction to said predetermined condition.

6. A reractable belt or the like comprising a retraction device, a strap connected to said device for retraction and extension, a strap guide, means for supporting said guide for movement relative to said retraction device, a stop in the path of said movement, means for determining when said strap has been retracted to a predetermined retracted condition and for moving said guide substantially to said stop only when said strap has been retracted to said condition, means orienting said strap from said device about said guide and beyond with a predetermined strap indentation correlated with the support of said guide for causing said strap to urge said guide against said stop during extension of said strap following retraction to said predetermined condition and for thereafter causing said strap to urge said guide away from said stop in response to reduction in tension of the strap beyond said guide, and means operative only when said guide is away from said stop for preventing extensile movement of said device.

7. A retractable belt or the like comprising a spring-wound retraction reel, a strap connected to said reel for retraction and extension, a strap guide supported adjacent to said reel for pivotal movement about an axis substantially parallel to the rotational axis of said reel between a first position away from said reel and a second position near said reel, said guide having means for engaging the strap upon said reel for moving said guide substantially to said first position only when a predetermined amount of strap is retracted, means orienting said strap from said reel about said guide and beyond with a predetermined strap indentation correlated with the pivotal support of said guide for causing said strap to urge said guide toward said first position when said strap is extended following retraction of said predetermined amount, and thereafter, in response to reduction in tension of the strap beyond said guide, for causing said strap to urge said guide to said second position, and means operative only when said guide is in said second position for preventing extensile rotation of said reel.

8. The retractable belt of claim 7, said guide comprising a yoke having a pair of sides which pivotally support the yoke and a cross-piece which engages said strap, said strap extending from said reel past the pivotal axis of said guide and then reversely around said cross-piece so as to embrace said yoke within said indentation.

9. The retractable belt of claim 7, said indentation defining an obtuse angle embracing said guide and its pivotal axis within said angle, said guide having a surface about which said indentation is formed, said surface being more remote from said reel than the pivotal axis of said guide when said guide is in said first position, and said guide having a stop against which said guide is urged in said first position.

10. A retractable belt or the like comprising a retraction reel, a strap connected to said reel for retraction and extension, a strap guide supported adjacent to said reel for movement between a first position away from said reel and a second position near said reel, means for determining when said strap has been retracted to a predetermined retracted condition and for moving said guide substantially to said first position only when said strap has been retracted to said condition, means orienting said strap about said guide with a predetermined strap indentation correlated with the support of said guide for causing said strap to move said guide to said second position in response to retractile movement of said strap at said guide after said strap has been extended following retraction to said predetermined condition, and means operative only when said guide is in said second position for preventing extensile rotation of said reel.

11. The retractable belt of claim 10, said guide extending across said reel and having one side facing said reel and adapted to engage the strap wound upon said reel, in order to constitute said determining means, and having another side over which the strap passes from said reel.

12. The retractable belt of claim 10, said guide being supported for rectilinear movement toward and away from said reel.

13. The retractable belt of claim 12, there being a latch abutment for holding said guide in said first position.

14. The retractable belt of claim 10, said reel being rotatable between a pair of spaced side plates, said guide extending across said reel and having opposite ends supported upon said side plates for rectilinear movement in passages upon said side plates.

15. The retractable belt of claim 10, said guide comprising a pin having a pair of legs embracing said reel, said legs being supported for movement in sleeves with substantial lateral play and having abutment means adapted to latch over an edge portion of at least one sleeve when said guide is in said first position.

16. A retractable belt or the like comprising a spring-wound retraction reel, a strap connected to said reel for retraction and extension, said reel having a ratchet wheel affixed to one end thereof, a number supported adjacent to said reel for pivotal movement about an axis substantially parallel to the rotational axis of said reel and having a pawl thereon, said member having means adapted to engage the strap wound upon said reel, and, only when a predetermined amount of strap is wound upon said reel, for moving said member away from said reel substantially to a first position at which said pawl is disengaged from said ratchet wheel, said member having an edge spaced from its pivotal axis, means orienting said strap from said reel over said edge with a predetermined strap indentation correlated with the support of said member for causing said strap to urge said member away from said reel and to maintain said member substantially in said first position during extension of said strap following retraction of said predetermined amount, and for thereafter causing said strap to urge said member toward said reel to a second position, at which said pawl engages said ratchet wheel, said ratchet wheel having teeth directed to prevent extensile rotation of said reel when said teeth are engaged with said pawl but to permit retractile rotation.

17. The retractable belt of claim 16, said strap orienting means comprising a casing supporting said reel and having an opening for directing the strap from said guide.

18. A retractable seat belt comprising a spring-wound retraction reel having ratchet wheels fixed to its ends, respectively, a strap connected to said reel for retraction and extension, a plate extending across said reel and pivotally supported adjacent to said reel for movement about a pivotal axis parallel to the rotational axis of said reel, said plate having a surface spaced from said pivotal axis and engageable with the strap wound upon said reel when a predetermined amount of strap is retracted to move said plate away from said reel to a first position, said plate having a curved edge surface spaced further from said pivotal axis, said strap passing from said reel past said edge and being indented thereby, whereby said strap exerts pressure upon said plate, the orientation of said plate in said first position relative to said strap being correlated with the drag of said strap upon said plate to maintain said plate substantially in said first position during extension of said strap and to move said plate toward said reel to a second position after extension of said strap, said plate having a pawl at each end thereof and said ratchet wheels having teeth facing said pawls, said pawls being free of said teeth when said plate is in said first position and being engaged with said teeth to prevent extensile rotation of said reel when said plate is in said second position.

19. A retractable belt or the like comprising a retraction device, a strap connected to said device for retraction and extension, a strap guide, means for supporting said guide for movement relative to said retraction device, a stop in the path of said movement, means for moving said guide substantially to said stop only when said strap is retracted to a predetermined retracted condition, means orienting said strap from said device about said guide and beyond with a predetermined strap indentation correlated with the support of said guide for causing said strap to urge said guide against said stop during extension of said strap following retraction to said predetermined condition and for thereafter causing said strap to urge said guide away from said stop in response to reduction in tension of the strap beyond said guide, and means operative only when said guide is away from said stop for preventing extension of said strap.

20. A retractable belt or the like comprising a spring-wound retraction reel, a strap connected to said reel for retraction and extension, a strap guide supported adjacent to said reel for pivotal movement about an axis substantially parallel to the rotational axis of said reel between a first position away from said reel and a second position near said reel, means for moving said guide substantially to said first position only when said strap is retracted to a predetermined retracted condition, means orienting said strap from said reel about said guide and beyond with a predetermined strap indentation correlated with the pivotal support of said guide for causing said strap to urge said guide toward said first position when said strap is extended following retraction to said predetermined condition, and thereafter, in response to reduction in tension of the strap beyond said guide, for causing said strap to urge said guide to said second position, and means operative only when said guide is in said second position for preventing extension of said strap.

21. A retractable belt or the like comprising a retraction reel, a strap connected to said reel for retraction and extension, a strap guide supported adjacent to said reel for movement between a first position away from said reel and a second position near said reel, means for moving said guide substantially to said first position only when said strap is retracted to a predetermined retracted condition, means orienting said strap about said guide with a predetermined strap indentation correlated with the support of said guide for causing said strap to move said guide to said second position in response to retractile movement of said strap at said guide after said strap has been extended following retraction to said predetermined condition, and means operative only when said guide is in said second position for preventing extension of said strap.

References Cited

UNITED STATES PATENTS

| | | |
|---|---|---|
| 3,100,669 | 8/1963 | Monroe. |
| 3,174,704 | 3/1965 | Replogle _____ 242—107.4 |

FOREIGN PATENTS 125,997  12/1901  Germany.

STANLEY N. GILREATH, Primary Examiner

W. H. SCHROEDER, Assistant Examiner

U.S. Cl. X.R.

297—388